US008919140B2

(12) United States Patent
Johnson et al.

(10) Patent No.: US 8,919,140 B2
(45) Date of Patent: Dec. 30, 2014

(54) METHOD AND APPARATUS PROVIDING AUXILIARY CABIN COOLING

(75) Inventors: Lonny E. Johnson, Peoria, IL (US); Bailey J. Ferkel, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 112 days.

(21) Appl. No.: 13/425,948

(22) Filed: Mar. 21, 2012

(65) Prior Publication Data
US 2013/0186590 A1 Jul. 25, 2013

Related U.S. Application Data

(60) Provisional application No. 61/589,546, filed on Jan. 23, 2012.

(51) Int. Cl.
*B60H 1/32* (2006.01)
(52) U.S. Cl.
USPC ............................................. 62/133; 62/244
(58) Field of Classification Search
USPC ............. 62/239, 133; 165/261, 262, 267, 270
See application file for complete search history.

(56) References Cited

U.S. PATENT DOCUMENTS

| 3,943,726 | A |   | 3/1976  | Miller             |
|-----------|---|---|---------|--------------------|
| 4,307,575 | A |   | 12/1981 | Popinski           |
| 4,506,516 | A | * | 3/1985  | Lord ............... 62/117 |
| 4,531,379 | A |   | 7/1985  | Diefenthaler, Jr.  |
| 4,658,597 | A |   | 4/1987  | Shum               |
| 4,658,599 | A |   | 4/1987  | Kajiwara           |
| 4,825,663 | A |   | 5/1989  | Nijjar et al.      |
| 4,955,203 | A |   | 9/1990  | Sundhar            |
| RE33,687  | E |   | 9/1991  | Greer              |
| 5,248,278 | A |   | 9/1993  | Fuerst et al.      |
| 5,291,960 | A | * | 3/1994  | Brandenburg et al. .... 180/65.27 |
| 5,309,731 | A | * | 5/1994  | Nonoyama et al. ............. 62/244 |
| 5,333,678 | A |   | 8/1994  | Mellum et al.      |
| 5,545,261 | A |   | 8/1996  | Ganz et al.        |
| 5,619,862 | A | * | 4/1997  | Ruger et al. .................... 62/409 |
| 5,826,435 | A |   | 10/1998 | Hange              |
| 5,899,081 | A |   | 5/1999  | Evans et al.       |
| 5,901,780 | A |   | 5/1999  | Zeigler et al.     |

(Continued)

FOREIGN PATENT DOCUMENTS

DE    10019204    10/2001
GB    2317445     3/1998

OTHER PUBLICATIONS www.webasto.us, Webasto Product (2010), pp. 1-2.

*Primary Examiner* — Ljiljana Ciric
*Assistant Examiner* — Alexis Cox
(74) *Attorney, Agent, or Firm* — Finnegan, Henderson, Farabow, Garrett & Dunner LLP

(57) ABSTRACT

A cooling system for a machine having an engine and an operator cabin includes a primary air conditioning unit, an auxiliary air conditioning unit, an electrical powering unit configured to electrically power the auxiliary air conditioning unit, a sensor configured to generate a signal indicative of a temperature within the operator cabin, and a controller in communication with the primary air conditioning unit, the auxiliary air conditioning unit, and the sensor. The controller selectively activates the primary air conditioning unit and the auxiliary air conditioning unit.

When the primary air conditioning unit is activated, a timer is started to determine the elapsed time during which the temperature within the operator's cabin exceeds the acceptable range of desired temperature, and the auxiliary unit is activated when the elapsed time exceeds a threshold time.

11 Claims, 3 Drawing Sheets

(56) References Cited

U.S. PATENT DOCUMENTS

| | | |
|---|---|---|
| 6,367,270 B2 | 4/2002 | Niimi et al. |
| 6,626,003 B1 | 9/2003 | Kortüm et al. |
| 6,932,148 B1 | 8/2005 | Brummett et al. |
| 7,024,876 B1 | 4/2006 | Kishek |
| 7,434,609 B2 | 10/2008 | Horn et al. |
| 7,614,368 B2 | 11/2009 | Gehres et al. |
| 7,793,856 B2 * | 9/2010 | Hernandez et al. ...... 237/12.3 B |
| 7,797,958 B2 | 9/2010 | Alston et al. |
| 8,078,324 B2 | 12/2011 | Oakes |
| 8,118,087 B2 * | 2/2012 | Saida et al. .................. 165/202 |
| 8,424,331 B2 * | 4/2013 | Monforte ........................ 62/244 |
| 2001/0027660 A1 * | 10/2001 | Moffa ............................. 62/239 |
| 2006/0112706 A1 * | 6/2006 | Inoue et al. ................. 62/238.3 |
| 2008/0134715 A1 | 6/2008 | Lewis et al. |
| 2008/0196436 A1 | 8/2008 | Connell et al. |
| 2008/0196877 A1 * | 8/2008 | Zeigler et al. ................. 165/202 |
| 2009/0139472 A1 | 6/2009 | Gehres et al. |
| 2009/0301702 A1 | 12/2009 | Zeigler et al. |
| 2010/0011789 A1 * | 1/2010 | Carlson et al. ................. 62/158 |
| 2010/0174456 A1 | 7/2010 | Beaudoin et al. |

\* cited by examiner

METHOD AND APPARATUS PROVIDING AUXILIARY CABIN COOLING

RELATED APPLICATIONS

This application is based on and claims the benefit of priority from U.S. Provisional Application No. 61/589,546 by Lonny E. JOHNSON et al., filed Jan. 23, 2012, the contents of which are expressly incorporated herein by reference.

TECHNICAL FIELD

The present disclosure relates generally to a machine and, more particularly, to a machine having an auxiliary cabin cooling system.

BACKGROUND

Most mobile machines include an operator cabin having a controlled environment that increases operator comfort. For example, the operator cabin can be heated or air conditioned to maintain the operator cabin at a desired temperature. When a machine is new, environmental control components within the operator cabin (e.g., an air conditioning unit or a heating unit) function at peak performance and easily maintain the desired temperature within the operator cabin. Over time, however, the performance of these components degrade, and it may become difficult or even impossible for the desired temperature to be maintained under all conditions. In these situations, the machines may need to be serviced in order to return performance of the environmental control components to previous levels. Unfortunately, this service may be disruptive and costly to the machine owner.

Mobile machines are often caused to idle for long periods of time. For example, the machines may idle overnight when the operator is resting and the machine's engine is being used to power the environmental control components. In some locations, however, idling for long periods of time may not be allowed for environmental reasons. In these situations, the machines must be turned off, resulting in ambient conditions within the operator cabin that are uncomfortable for the operator. And even if long periods of idling are allowed, doing so can be inefficient and costly.

One attempt to address one or more of the problems described above is disclosed in U.S. Pat. No. 5,333,678 that issued to Mellum et al. on Aug. 2, 1994 ("the '678 patent"). In particular, the '678 patent describes a machine having an auxiliary power unit that can be used to selectively power and control environmental conditions within an operator cabin of the machine when a main engine and associated main air conditioning components of the machine are turned off. The auxiliary power unit includes an auxiliary engine that is smaller than the main engine, and auxiliary air conditioning components driven by the auxiliary engine.

Although using the auxiliary power unit of the '678 patent may help to avoid long idling periods of a machine's main engine, the auxiliary power unit may still be problematic. In particular, the auxiliary power unit, because of its numerous duplicative components, may be expensive, complicated to control, and decrease a reliability of the machine. In addition, the auxiliary power unit may have no effect on a capacity of the main air conditioning components to cool the operator cabin during operation of the main engine.

The disclosed cooling system is directed to overcoming one or more of the problems set forth above and/or other problems of the prior art.

SUMMARY

In one aspect, the present disclosure is directed to a cooling system for a machine having an engine and an operator cabin. The cooling system may include a first pump configured to circulate coolant through the engine, a heat exchanger configured to receive coolant from the engine and transfer heat between the coolant and air passing through the heat exchanger, and a fan configured to generate a flow of air through the heat exchanger and into the operator cabin. The cooling system may also include an air conditioning unit configured to chill coolant, and a second pump configured to circulate coolant from the air conditioning unit through the heat exchanger.

In another aspect, the present disclosure is directed to another cooling system for a machine having an engine and an operator cabin. This cooling system may include a primary air conditioning unit, an auxiliary air conditioning unit, a sensor configured to generate a signal indicative of a temperature within the operator cabin, and a controller in communication with the primary air conditioning unit, the auxiliary air conditioning unit, and the sensor. The controller may be configured to selectively activate the primary air conditioning unit only during operation of the engine when the signal indicates the temperature within the operator cabin is above a desired temperature, and selectively activate the auxiliary air conditioning unit during shutdown of the engine when the signal indicates the temperature within the operator cabin is above the desired temperature. The controller may also be configured to selectively activate the auxiliary air conditioning unit to augment a cooling capacity of the primary air conditioning unit during operation of the engine only when the signal indicates the temperature within the operator cabin has been above the desired temperature for at least a threshold amount of operational time of the primary air conditioning unit.

In yet another aspect, the present disclosure is directed to a method of cooling an operator cabin of a machine. The method may include detecting a temperature of the operator cabin, selectively activating a primary air conditioning unit to cool the operator cabin when the temperature of the operator cabin is above a desired temperature only during operation of an engine of the machine, and selectively activating an auxiliary air conditioning unit to cool the operator cabin when the temperature of the operator cabin is above the desired temperature during shutdown of the engine. The method may further include selectively activating the auxiliary air conditioning unit to augment a cooling capacity of the primary air conditioning unit during operation of the engine only when the temperature of the operator cabin has been above the desired temperature for at least a threshold amount of operational time of the primary air conditioning unit.

DETAILED DESCRIPTION

Figure 1:
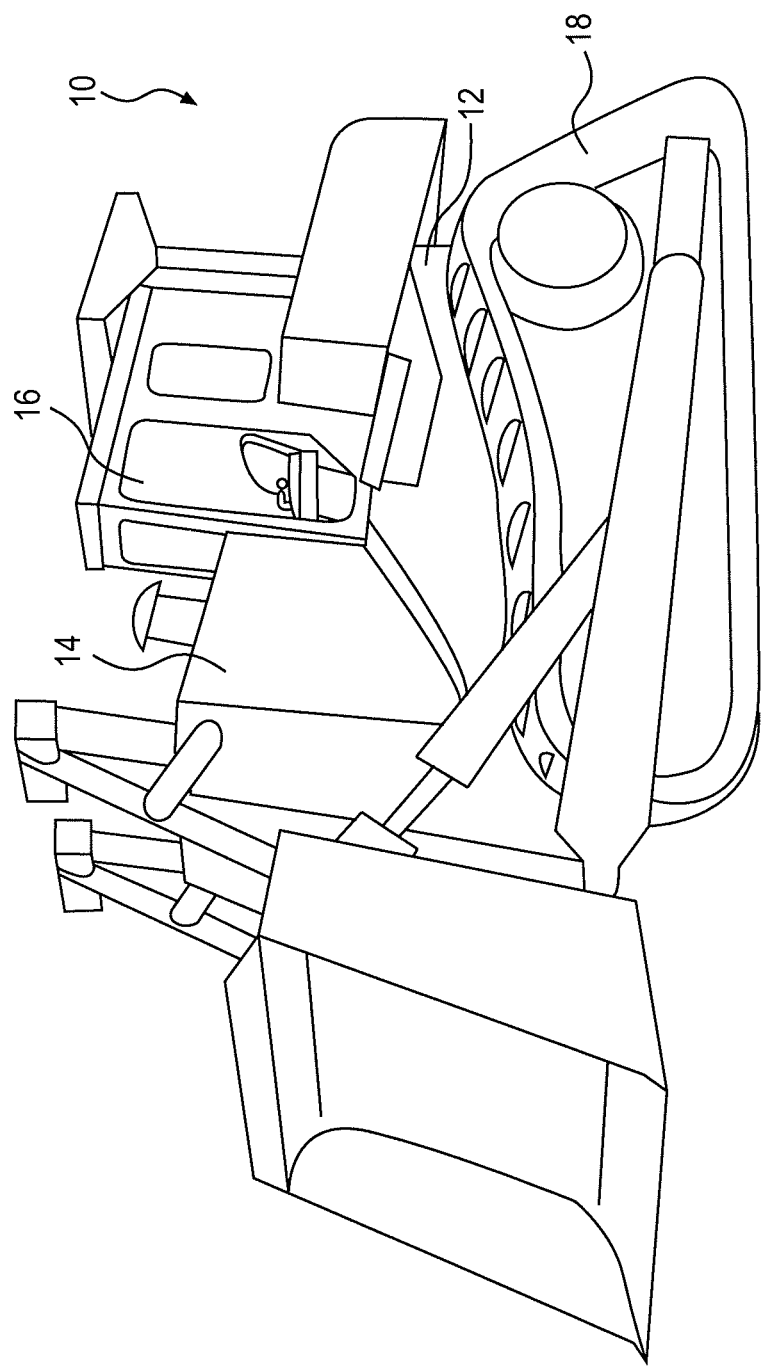
FIG. 1 is a pictorial illustration of an exemplary disclosed machine.

FIG. 1 illustrates an exemplary embodiment of a machine 10. Machine 10 may be a mobile machine that performs some type of operation associated with an industry such as mining, construction, farming, or another industry known in the art. For example, machine 10 may be an earth moving machine such as a track-type tractor (shown in FIG. 1), a wheel loader, a haul truck, or another type of mobile machine. Machine 10, in one example, may include a frame 12 that supports an engine 14 and an operator cabin (cabin) 16. Machine 10 may also include one or more traction devices 18 that are rotatingly connected to frame 12 and driven by engine 14 to propel machine 10.

Cabin 16 may be an onboard location from which an operator observes performance of machine 10 and provides instructions for controlling machine 10. In the disclosed example, cabin 16 is a substantially enclosed structure supported by frame 12 that includes one or more interface devices (not shown) located proximate an operator seat (not shown). It is contemplated, however, that cabin 16 may alternatively be a more open platform, if desired, and may or may not include a seat (i.e., the operator may be required to stand during control of machine 10).

Figure 2:
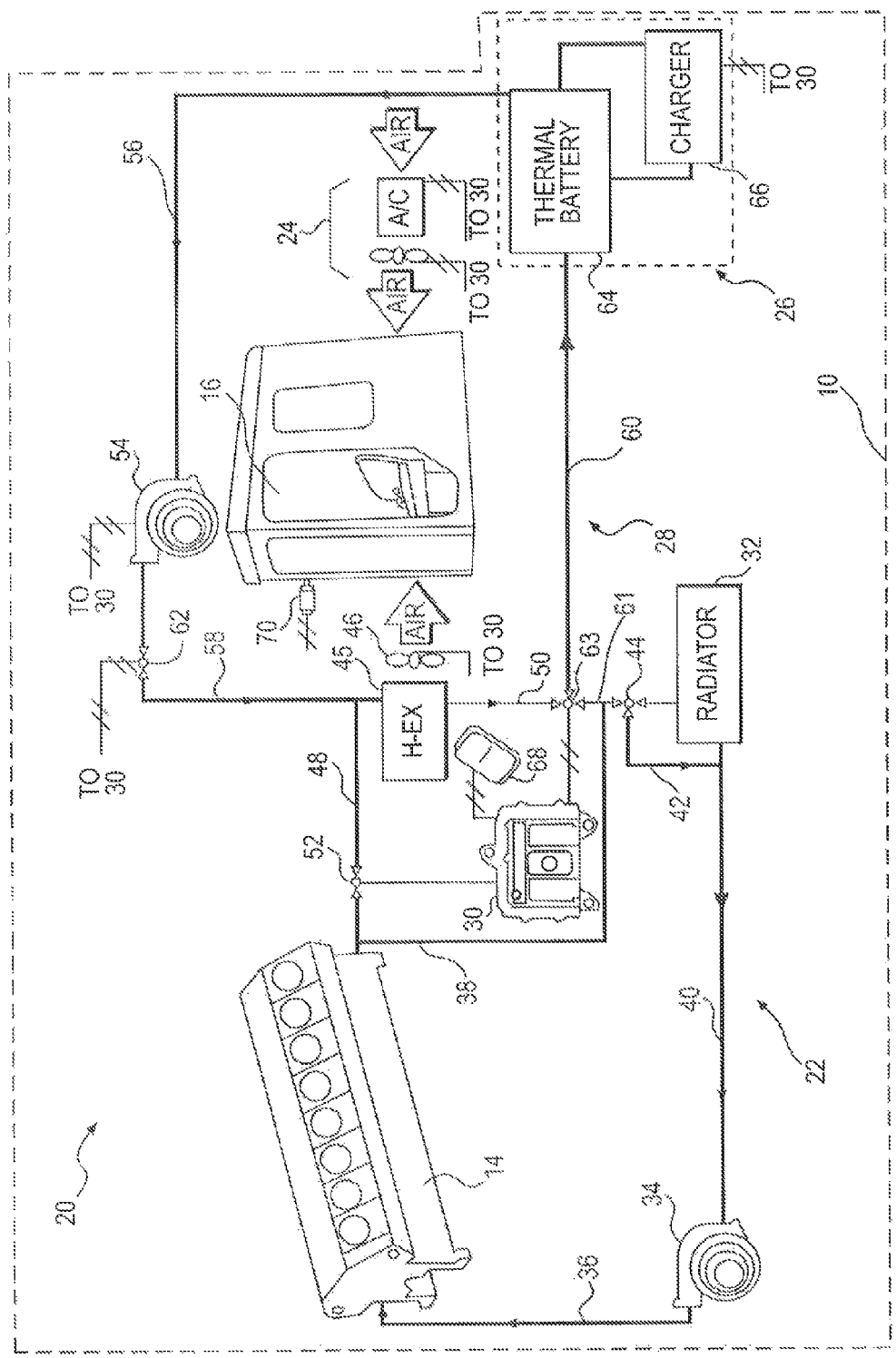
FIG. 2 is a diagrammatic illustration of an exemplary disclosed cooling system that may be used in conjunction with the machine of FIG. 1.

As shown in FIG. 2, machine 10 may be equipped with a cooling system 20 that facilitates the production of power within engine 14 and promotes operator comfort within cabin 16. Cooling system 20 may include, among other things, an engine circuit 22 configured to circulate coolant through engine 14, a primary air conditioning unit (PACU) 24 configured to cool cabin 16, an auxiliary air conditioning unit (AACU) 26 also configured to cool cabin 16, and an auxiliary circuit 28 configured to circulate coolant through auxiliary air conditioning unit 26. Coolant flows may be regulated through any one or both of engine and auxiliary circuits 22, 28 by a controller 30 to adjust temperatures of engine 14 and cabin 16 within desired limits.

Engine circuit 22 may include components that cooperate to cool engine 14. Specifically engine circuit 22 may include a heat exchanger 32, and a primary pump 34 configured to pump coolant through engine 14 and heat exchanger 32. Coolant such as water, glycol, a water/glycol mixture, a blended air mixture, or any other heat transferring fluid may be pressurized by primary pump 34 and directed through a passage 36 to engine 14 to absorb heat therefrom. After exiting engine 14, the coolant may be directed through an outlet passage 38 and an inlet passage 61 to heat exchanger 32 to release the absorbed heat, and then be drawn through an outlet passage 40 back to primary pump 34. A bypass passage 42 having a valve 44 (e.g., a mechanical thermostat valve) may selectively direct some or all of the coolant from outlet passage 38 around heat exchanger 32 directly to outlet passage 40 in response to one or more input, for example in response to a temperature of coolant in outlet passage 38 falling below a threshold setting of valve 44.

Primary pump 34 may be engine-driven to generate the flow of coolant described above. In particular, primary pump 34 may include an impeller (not shown) disposed within a volute housing having an inlet and an outlet. As the coolant enters the volute housing, blades of the impeller may be rotated by operation of engine 14 to push against the coolant, thereby pressurizing the coolant. An input torque imparted by engine 14 to primary pump 34 may be related to a pressure of the coolant, while a speed imparted to primary pump 34 may be related to a flow rate of the coolant. It is contemplated that primary pump 34 may alternatively embody a piston type pump, if desired, and may have a variable or constant displacement. It is also contemplated that primary pump 34 may alternatively be electrically driven, if desired.

Heat exchanger 32 may embody the main radiator of engine 14 and be situated to dissipate heat from the coolant after it passes through engine 14. As the main radiator of engine 14, heat exchanger 32 may be a liquid-to-air type of exchanger. That is, a flow of air may be directed through channels of heat exchanger 32 such that heat from coolant within adjacent channels is transferred to the air. In this manner, the coolant passing through engine 14 may be cooled to below a predetermined operating temperature of engine 14.

A cooling fan (not shown) may be associated with heat exchanger 32, if desired, to generate the flow of cooling air. In particular, the fan may include an input device (not shown) such as a belt-driven pulley, a hydraulically-driven motor, or an electrically-powered motor that is mounted to or otherwise associated with engine 14, and fan blades (not shown) fixedly or adjustably connected to the input device. The cooling fan may be powered by engine 14 to cause the input device to rotate and the connected fan blades to blow or draw air across heat exchanger 32. It is contemplated that the cooling fan may additionally blow or draw air across engine 14 for external cooling thereof, if desired.

Bypass passage 42, together with valve 44, may be used to regulate a temperature of the coolant passing through engine 14 and, thereby, the temperature of engine 14 itself. Specifically, in response to a desired increase in coolant temperature (or at least a desire to prevent or reduce a decrease in coolant temperature), valve 44 may move to restrict or even block the flow of coolant from outlet passage 38 to inlet passage 61 and heat exchanger 32 and, simultaneously, at least partially open the connection between outlet and bypass passages 38, 42. In this manner, the flow of coolant through heat exchanger 32 may be reduced or even completely blocked, thereby reducing the amount of heat transfer from the coolant to the air passing through heat exchanger 32. In contrast, in response to a desired decrease in coolant temperature, valve 44 may move to reduce the restriction of fluid flow from outlet passage 38 to inlet passage 61, while simultaneously increasing the restriction on flow to bypass passage 42. In this manner, the flow of coolant through heat exchanger 32 may be increased, thereby increasing the amount of heat transfer from the coolant to the air passing through heat exchanger 32.

Engine circuit 22 may also include components that cooperate to heat cabin 16. Specifically engine circuit 22 may include a heat exchanger 45, and a fan 46 configured to generate a flow of air directed through heat exchanger 45 and into cabin 16. Coolant pressurized by primary pump 34 may be directed from engine 14 through an inlet passage 48 to heat exchanger 45 to transfer heat with the air passing through heat exchanger 45. Inlet passage 48 may be connected to receive heated coolant from engine 14 in parallel with outlet passage 38. The coolant may then be drawn through an outlet passage 50 to valve 44. A valve 52 (e.g., a solenoid-operate valve) may selectively allow, restrict, or even completely block fluid flow from engine 14 through inlet passage 48 in response to one or more input, for example in response to a desired ambient temperature within cabin 16 and/or an operational status of engine 14.

Heat exchanger 45 may embody the heater core of cabin 16 and be situated to transfer heat from coolant that has been previously warmed by operation of engine 14 to air as it is forced into cabin 16 by fan 46. In the disclosed embodiment, fan 46 may be electrically powered so that it can be mounted at a location remote from engine 14, for example in a dashboard, wall, or ceiling of cabin 16. It is contemplated, however, that fan 46 could alternatively be mechanically driven by engine 14, if desired, and remotely connected to cabin 16 by way of one or more conduits (not shown). In any of these configurations, a temperature of the air entering cabin 16 may be at least partially dependent on a flow rate of coolant passing through heat exchanger 45, a temperature of the coolant entering heat exchanger 45, a flow rate of the air passing through heat exchanger 45, and a temperature of the air entering heat exchanger 45.

PACU 24 may embody a conventional air conditioning unit utilized in mobile applications. For example, PACU 24 may include an engine-driven compressor, a condenser, an evaporator, and a fan. The compressor may be configured to compress a refrigerant, for example R-134, propane, nitrogen, helium, or another high-pressure fluid known in the art. As the refrigerant is pressurized, it is vaporized and moves into the condenser as a high-pressure gas. Within the condenser, the refrigerant cools and condenses back into liquid form at a lower energy state than when initially within the compressor. The lower-energy liquid then passes into the evaporator, where it is expanded, causing a rapid drop in temperature. The fan blows air through the evaporator, chilling the air and warming the refrigerant in preparation for another cycle. PACU 24 may be selectively activated by controller 30 to direct a flow of the chilled air into cabin 16 based on one or more inputs, for example based on a temperature within cabin 16. Because PACU 24 may be engine-driven, PACU 24 may be utilized to cool cabin 16 only when engine 14 is operational.

Auxiliary circuit 28 may be in communication with heat exchanger 45 and configured to selectively utilize heat exchanger 45 to cool cabin 16 when engine 14 is shutdown. Specifically, auxiliary circuit 28 may include an auxiliary pump 54 configured to pump coolant through AACU 26 and heat exchanger 45. Coolant such as water, glycol, a water/glycol mixture, a blended air mixture, or any other heat transferring fluid may be drawn from AACU 26 via a passage 56, pressurized by auxiliary pump 54, and directed through an inlet passage 58 to absorb heat from heat exchanger 45. After exiting heat exchanger 45, the coolant may be directed through an inlet passage 60 to AACU 26 to release the absorbed heat. A first valve 62 (e.g., a two-way valve) may selectively control fluid flow through inlet passage 58 in response to one or more inputs, for example in response to an ambient temperature of cabin 16 and an operational status of engine 14. A second valve 63 (e.g., a three-way valve) may selectively control fluid flow from outlet passage 50 to either of inlet passage 60 or inlet passage 61 that leads to heat exchanger 32, also based on the ambient temperature of cabin 16 and an operational status of engine 14.

As coolant from auxiliary circuit 28 passes through heat exchanger 45, the coolant (having been previously chilled by AACU 26) may absorb heat from air being forced through heat exchanger 45 and into cabin 16 by fan 46. As described above, a temperature of the air entering cabin may be at least partially dependent on a flow rate of coolant passing through heat exchanger 45, a temperature of the coolant entering heat exchanger 45, a flow rate of the air passing through heat exchanger 45, and a temperature of the air entering heat exchanger 45.

In the disclosed embodiment, AACU 26 may be an electrically powered air conditioning unit having a thermal battery 64 and a charger 66 configured to selectively charge thermal battery 64. Charger 66 may be selectively activated to charge thermal battery 64 during engine operation, and electrically powered by an onboard engine battery (not shown) and/or an alternator or generator (not shown) that is mechanically driven by engine 14. Charger 66 may be activated to charge thermal battery 64 in response to a temperature of thermal battery 64, for example when a temperature of thermal battery 64 falls below a threshold temperature. Thermal battery 64 may be discharged to chill coolant within auxiliary circuit 28 during engine shutdown, when AACU 26 is being used to cool cabin 16. It is contemplated that, in some applications, charger 66 may also be used to charge thermal battery 64 during engine shutdown and that thermal battery 64 may selectively discharge during engine operation, if desired. It is also contemplated that a manual input device, for example a switch 68 may be utilized to selectively allow or inhibit operation of charger 66, if desired. It may be possible for other air conditioning configurations to be utilized in place of AACU 26, if desired.

Thermal battery 64 may include, among other things, a matrix of heat exchanger elements (not shown) interspersed with cold storage layers (not shown). For example, thermal battery 64 may include a first plurality of heat exchanger elements and a second plurality of heat exchanger elements disposed adjacent each other on heat exchanger layers that are sandwiched between the cold storage layers. The first plurality of heat exchanger elements may be associated with charger 66 and configured to receive a flow of chilled coolant during operation of engine 14. This chilled coolant may be used to cool or even freeze the cold storage layers that are between the heat exchanger layers. The second plurality of heat exchanger elements may be associated with auxiliary circuit 28 and configured to transfer heat from coolant within auxiliary circuit 28 (i.e., heat absorbed via heat exchanger 45 from the air entering cabin 16) to the cold storage layers during subsequent engine shutdown. The cold storage layers may include, for example, graphite and/or foam aluminum that has been saturated with water. Once frozen, the cold storage layers may be capable of absorbing heat for an extended period of time without requiring additional charging, for example up to about 5-15 hours, depending on sizing and ambient conditions.

Charger 66 may embody an electrically powered air conditioner that is configured to chill the coolant circulated through the first plurality of heat exchanger elements within thermal battery 64. Charger 66 may include, among other things, a compressor, a condenser, an evaporator, and a fan, and operate in a manner similar to PACU 24. In contrast to PACU 24, however, the compressor of charger 66 may be powered by electricity from an engine battery and/or from an alternator or generator that is driven by engine 14. To help reduce electrical storage demands of machine 10, charger 66 may typically only charge thermal battery 64 during engine operation.

Controller 30 may be a single microprocessor or multiple microprocessors that include a means for controlling an operation of cooling system 20. Numerous commercially available microprocessors can be configured to perform the functions of controller 30. It should be appreciated that controller 30 could readily be embodied in a general engine or machine microprocessor capable of controlling numerous engine and/or machine functions. Controller 30 may include a memory, a secondary storage device, a processor, and any other components for running an application. Various other circuits may be associated with controller 30 such as power supply circuitry, signal conditioning circuitry, solenoid driver circuitry, and other types of circuitry.

Controller 30 may rely on input from one or more sensors during regulation of PACU 24, AACU 26, valves 52, 62, 63, and/or auxiliary pump 54. In the disclosed exemplary embodiment, controller 30 may rely on at least one sensor 70 associated with cabin 16, although any number and types of sensors may be utilized. Sensor 70 may embody, for example, a temperature sensor configured to generate a signal indicative of an ambient temperature within cabin 16. Sensor 70 may direct the signal to controller 30 for further processing.

Figure 3:
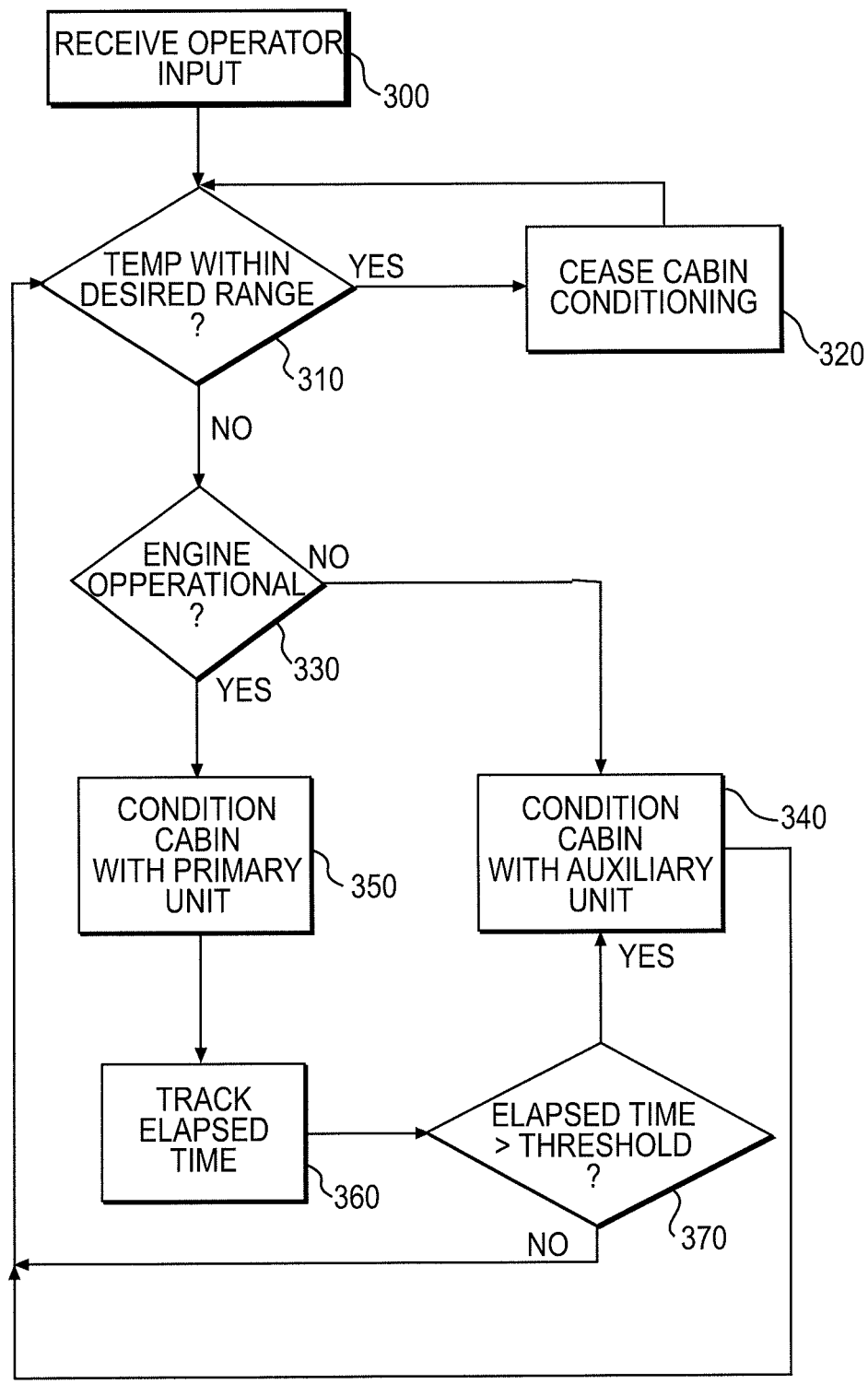
FIG. 3 is a flowchart depicting an exemplary disclosed method of controlling the cooling system of FIG. 2.

FIG. 3 illustrates an exemplary cooling system process performed by controller 30. FIG. 3 will be discussed in more detail in the following section to better illustrate the disclosed concepts.

INDUSTRIAL APPLICABILITY

The disclosed cooling system may be used in any engine, power system, or machine application where low-cost, efficient, high-performance cooling of an operator cabin is desired. The disclosed cooling system may provide for low-cost cooling via dual-use components (i.e., via components used for both heating and cooling of cabin 16) that reduce part duplication and associated costs. The disclosed cooling system may also provide for efficient cooling of cabin 16 by allowing cooling during extended periods of time without requiring operation of engine 14. The disclosed cooling system may further provide for high-performance cooling by utilizing AACU 26 to augment a cooling capacity of PACU 24. The operation of cooling system 20 will now be described.

The operator of machine 10 may activate cooling system 20 at any time during machine operation via an onboard interface (not shown). For example, the operator may select a desired mode of operation (e.g., air conditioning) and a desired ambient temperature of cabin 16 (e.g., 70° F.). Controller 30 may receive this input (Step 300) and the signal from sensor 70 indicative of an actual temperature of cabin 16 (e.g., 75° F.), and determine if the actual temperature is within an acceptable range (e.g., +/−2° F.) of the desired temperature (Step 310). If the actual temperature is within the acceptable range of the desired temperature (Step 310: Yes), any conditioning of ambient conditions currently ongoing may cease (Step 320), and control may return to step 310.

If at step 310, controller 30 determines that the actual temperature in cabin 16 is not within the acceptable range of the desired temperature (Step 310: No), controller 30 may then determine if engine 14 is operational (Step 330). When controller 30 determines that engine 14 is shutdown (Step 330: No) and the actual temperature is significantly higher than the desire temperature (i.e., outside of the acceptable range), controller 30 may activate AACU 26 to cool cabin 16 (Step 340) via auxiliary circuit 28. In particular, controller 30 may direct electrical current to auxiliary pump 54 to generate a flow of coolant through AACU 26 and heat exchanger 45, and simultaneously direct electrical current to fan 46 to generate a flow of air through heat exchanger 45 and into cabin 16. Controller 30 may also cause valves 62 and 63 to move to positions that allow coolant flow through passages 58 and 60, while simultaneously causing valve 52 to block coolant flow from auxiliary circuit 28 through inlet passage 48 to engine 14. Valve 63, when moved to allow coolant flow through inlet passage 60, may also be in a position to block coolant flow from auxiliary circuit 28 in reverse direction through outlet passage 38 or to valve.

As the coolant flows through auxiliary circuit 28, thermal battery 64, having been previously charged (i.e., frozen) by charger 66 during earlier engine operation, may now chill the coolant. As the chilled coolant flows through heat exchanger 45, the chilled coolant may absorb heat from heat exchanger 45, which may in turn absorb heat from the air driven through heat exchanger 45 by fan 46. In this manner, cold air may flow into cabin 16 to cool cabin 16 to a level desired by the operator even when engine 14 is shutdown for extended periods of time. Control may cycle through steps 310-340 as long as engine 14 remains shutdown or until the actual temperature within cabin 16 is reduced by AACU 26 into the acceptable range.

If at step 330, however, controller 30 determines that engine 14 is operational, controller 30 may cause PACU 24 to attempt to cool cabin 16 (Step 350) instead of AACU 26. Charger 66 of ACCU 26 may be caused to charge thermal battery 64 at this time. PACU 24 may only be used to cool engine 14 when engine 14 is operational, because the compressor of PACU 24 may be mechanically driven by engine 14.

After activating PACU 24, controller 30 may begin tracking an amount of elapsed time (Step 360). When PACU 24 is functioning optimally (e.g., when PACU 24 is new) and machine 10 is operating under expected environmental conditions, PACU 24 should be capable of adequately cooling cabin 16 within a reasonable amount of time. However, as PACU 24 ages and/or when machine 10 is operated in unexpected environmental condition (e.g., in excessive temperatures), it may be difficult or even impossible for PACU 24 to cool cabin 16 as fast as desired by the operator and/or to the level desired by the operator.

Controller 30 may compare the amount of time elapsed since activation of PACU 24 to a threshold amount of time (e.g., about 30-300 seconds) (Step 370). If the amount of elapsed time is less the threshold amount of time, control may return to step 310, allowing PACU 24 more time to cool cabin 16. If, however, at step 370, controller 30 determines that the amount of time elapsed since activation of PACU 24 exceeds the threshold amount of time, controller 30 may conclude that PACU 24 may be unable to adequately cool cabin 16 under the given conditions. Accordingly, controller 30 may activate AACU 26 to augment the cooling capacity of PACU 24 (Step 340) when the elapsed time exceeds the threshold amount of time.

During engine operation, when AACU 26 is not activated to cool cabin 16, controller 30 may cause valves 62 and 63 to isolate AACU 26 from coolant flows passing through engine 14. That is, valve 62 may be closed to block coolant flow through passage 56, and valve 62 may be moved to block inlet passage 60, but open coolant flow from outlet passage 50 to valve 44.

When AACU 26 is being used, alone or together with PACU 24, to cool cabin 16, coolant from engine 14 may not be allowed to pass through heat exchanger 45. In particular engine 14 may be isolated from auxiliary circuit 28 via valves 52 and 63. Coolant from engine 14 may instead flow only through outlet passage 38 to valve 44 at this time.

It will be apparent to those skilled in the art that various modifications and variations can be made to the disclosed cooling system without departing from the scope of the disclosure. Other embodiments of the cooling system will be apparent to those skilled in the art from consideration of the specification and practice of the thermal management system disclosed herein. For example, although valves 52 and 62 are shown as separate two-way valves that allow retrofitting of auxiliary circuit 28 to an existing engine circuit 22 with few component changes to machine 10, it is contemplate that valves 52 and 62 may alternatively be replaced by a single three-way valve located at an intersection of passages 48 and 58, if desired. It is intended that the specification and examples be considered as exemplary only, with a true scope of the disclosure being indicated by the following claims and their equivalents.

What is claimed is:

1. A cooling system for a machine having an engine and an operator cabin, the cooling system comprising:
 a primary air conditioning unit;
 an auxiliary air conditioning unit;

an electrical power unit configured to electrically power the auxiliary air conditioning unit;

a sensor configured to generate a signal indicative of a temperature within the operator cabin; and a controller in communication with the primary air conditioning unit, the auxiliary air conditioning unit, and the sensor, the controller being configured to:

selectively activate the primary air conditioning unit only during operation of the engine when the signal indicates the temperature within the operator cabin is outside of an acceptable range of a desired temperature;

selectively activate the auxiliary air conditioning unit during shutdown of the engine when the signal indicates the temperature within the operator cabin is outside of an acceptable range of the desired temperature;

initiate tracking of elapsed time when the signal indicates that the temperature within the operator cabin is outside of the acceptable range of the desired temperature; and selectively activate the auxiliary cooling unit to augment a cooling capacity of the primary air conditioning unit when the elapsed time exceeds a threshold time.

2. The cooling system of claim 1, wherein the threshold time is between about 30 seconds and about 300 seconds.

3. The cooling system of claim 1, wherein
the primary air conditioning unit is mechanically driven by the engine.

4. The cooling system of claim 1, wherein the auxiliary air conditioning unit includes a thermal battery that is selectively charged during engine operation and selectively discharged during engine shutdown.

5. The cooling system of claim 4, further including a switch movable by an operator to select a first mode associated with charging of the thermal battery, and a second mode associated with discharging of the thermal battery.

6. The cooling system of claim 1, wherein:
the primary air conditioning unit includes:
a primary heat exchanger; and
a primary fan configured to direct air through the primary heat exchanger into the operator cabin; and
the auxiliary air conditioning unit includes:
an auxiliary heat exchanger; and
an auxiliary fan configured to direct air through the auxiliary heat exchanger into the operator cabin.

7. The cooling system of claim 6, wherein the auxiliary heat exchanger is configured to selectively receive coolant heated by the engine and transfer heat from the coolant to air directed into the operator cabin to heat the operator cabin.

8. The cooling system of claim 7, further including a radiator in selective fluid communication with the auxiliary heat exchanger and configured to dissipate heat from the coolant to the atmosphere.

9. A method of cooling an operator cabin of a machine, the method comprising:
detecting a temperature of the operator cabin;
selectively activating a primary air conditioning unit to cool the operator cabin when the temperature of the operator cabin is above a desired temperature only during operation of an engine of the machine;
electrically powering an auxiliary air conditioning unit with an electrical power unit;
selectively activating the auxiliary air conditioning unit to cool the operator cabin when the temperature of the operator cabin is above the desired temperature during shutdown of the engine;
initiate tracking of elapsed time when the temperature of the operator cabin exceeds the desired temperature; and
selectively activate the auxiliary cooling unit to augment a cooling capacity of the primary air conditioning unit when the elapsed time exceeds a threshold time.

10. The method of claim 9, wherein:
the auxiliary air conditioning unit includes a thermal battery; and
the method further includes:
selectively charging the thermal battery during operation of the engine; and
selectively discharging the thermal battery during shutdown of the engine.

11. The method of claim 9, wherein:
selectively activating the auxiliary air conditioning unit includes directing coolant from the auxiliary air conditioning unit through a heat exchanger simultaneous with a flow of air that is directed through the heat exchanger into the operator cabin; and the method further includes selectively directing heated coolant from the engine through the heat exchanger to heat the operator cabin.

* * * * *